United States Patent [19]

Canfield et al.

[11] Patent Number: 4,528,016
[45] Date of Patent: Jul. 9, 1985

[54] GLASS SHEET TREATING FURNACE WITH A ROLLER CONVEYOR

[76] Inventors: Douglas M. Canfield, Suffern, N.Y.; Casso-Solar Corporation, 02, Allendale, N.J.

[21] Appl. No.: 531,906

[22] Filed: Sep. 12, 1983

[51] Int. Cl.³ .............................................. C03B 27/00
[52] U.S. Cl. ...................................... 65/163; 65/111; 65/162; 65/348
[58] Field of Search ................ 65/111, 118, 162, 273, 65/104, 348, 349, 350, 163

[56] References Cited

U.S. PATENT DOCUMENTS

| | | | |
|---|---|---|---|
| 3,744,985 | 7/1973 | Peternel | 65/118 X |
| 4,133,667 | 1/1979 | Nitschke | 65/348 X |
| 4,297,121 | 10/1981 | Rhonehouse | 65/348 |
| 4,332,608 | 6/1982 | Rhonehouse | 65/348 |

FOREIGN PATENT DOCUMENTS

410547 5/1934 United Kingdom .................. 65/118

*Primary Examiner*—Arthur Kellogg
*Attorney, Agent, or Firm*—Karl F. Ross; Herbert Dubno

[57] ABSTRACT

A glass furnace, e.g. for annealing or tempering glass, has a roller conveyor whose fused rollers rest upon stub rollers overshot by a belt which alternately overshoots and undershoots the stub rollers. A drive for the belt advantageously is controlled by a computer allowing display of the heater parameters etc. and includes a pair of motors connected to the belt with overrunning clutches and driven in opposite senses to alternately drive the belt and thereby prevent play in the movement of the latter. The heater overlying the conveyor has a matrix array of individually or collectively controllable infra-red heaters.

9 Claims, 8 Drawing Figures

GLASS SHEET TREATING FURNACE WITH A ROLLER CONVEYOR

FIELD OF THE INVENTION

The present invention relates to a glass furnace and, more particularly, to a furnace of the type in which glass articles, generally panes of glass, are subjected to a heat treatment (heating, cooling or a controlled combination of the two), as these articles are moved more or less continuously in a travel direction but in a linearly reciprocating or somewhat retrograde motion which ensures uniform heating of the article.

More particularly, the invention relates to a glass furnace for the tempering, annealing, bending or other heat treatment of glass panes utilizing a reciprocatory advance on a roller conveyor with high speed entry and exit facilities.

BACKGROUND OF THE INVENTION

It has been discovered that the simple movement of glass articles through a tempering or annealing tunnel provided with heaters or means for the controlled cooling of glass is not satisfactory for many purposes and for a variety of reasons. For example, if the velocity of the glass is too low, the glass object may sag at high temperatures between rollers or a roller conveyor, or the glass may be nonuniformly heated. If the velocity is sufficient to avoid this problem and continuous undirectional movement is provided, then the tunnel must be extremely long. Conveyor systems which do not use rollers and maintain the same support surface in contact with the same region of the object to be transported prevent the contact zone from being heated to the same extent and in the same manner as adjacent noncontact zones.

Consequently, systems have been developed which, during the advance of the glass articles, impose a retrograde motion thereon so that, while the articles progress more or less continuously into the heat treatment chamber and emerge more or less continuously from the heat chamber, at least while the articles are in the heat treatment chamber, they undergo a back-and-forth movement which reduces the length of the chamber required for the desired degree of heat treatment while minimizing prolonged contact between the supporting elements, generally rollers, and the glass.

Roller conveyors for this purpose have been driven in various fashions and in general it has been found to be disadvantageous to utilize the simplest drive mode for the rollers of the conveyor, namely, sprockets on the ends of the support rollers and a continuous chain meshing with all of these sprockets. Hence fairly complex systems have been developed in the art to support and drive the rollers and these too have not proved to be fully satisfactory since they do not allow for effective frictional entrainment with slip control where required or provide a drive substantially without excessive play so that the retrogradal reciprocating action can be generated without imposing response lags.

The rollers structure themselves have left much to be desired since they have not generally been readily replaceable or accessible for repair, assembly or maintenance.

Within the heating chamber truly effective control of the various zones could not be asserted in spite of relatively sophisticated techniques for monitoring and regulating temperatures.

As a consequence, this field has generated a large number of patents some of which have been considered by us and which are listed below:

| | | |
|---|---|---|
| 3,867,748 | 3,706,544 | 4,332,608 |
| 4,297,121 | 3,338,569 | 4,074,805 |
| 4,300,937 | 3,643,789 | 4,133,667 |
| 4,341,546 | 3,608,876 | 4,233,053 |
| 4,332,608 | 4,066,430 | 4,364,765 |
| 3,806,312 | 3,994,711 | 4,282,026 |
| 4,314,836 | 4,230,475 | 4,364,766 |
| | 4,386,952 | |

In general, while these systems attack various aspects of the problems discussed above, they have not provided a satisfactory solution to the conveyor operation, heating control and conveyor structure drawbacks mentioned previously.

OBJECTS OF THE INVENTION

It is the principal object of the present invention to provide an improved oven for the heat treatment of glass whereby the above described disadvantages are obviated.

Another object of the invention is to provide an oven for the purposes described with improved means for displacing the glass objects through the oven so that a more effective drive of the conveyor rollers is obtained.

Another object of our invention is to provide an improved roller conveyor assembly for a glass oven.

Still another object of the invention is to provide an improved system for monitoring the heating operations and conditions within such an oven.

SUMMARY OF THE INVENTION

These objects and others which will become apparent hereinafter are attained, in accordance with the present invention, in an oven for heat treatment of glass objects which comprises a roller conveyor extending from an inlet side of an oven chamber through the oven chamber and to an outlet side thereof, means for driving supporting rollers of this conveyor on which the glass articles (for example panes or sheets) can ride in contact with these supporting rollers which are composed of fused silica and an array of radiant heating elements, i.e. so-called infrared quartz heaters disposed in at least one panel in a matrix array above this conveyor.

According to an important feature of this invention, each of the supporting rollers, which extend across the full width of the conveyor width and are spaced apart uniformly and lying generally in a plane, is supported on a pair of stub rollers on each side of the conveyor, the stub rollers lying in a common plane below the fused silica tubular supporting rollers and engaging only the extremities thereof. Between each pair of stub rollers carrying a respective end of a supporting roller, a deflecting stub roller is provided and the drive for the supporting rollers is effected by a roller drive belt which overshoots both of the stub rollers of a particular supporting roller and undershoots the respective deflecting roller so that the fused silica supporting roller rests directly upon the surface of the roller drive belt where the roller drive belt overshoots the upper stub rollers.

This construction has enormous advantages over prior art systems which couple the fused silica supporting rollers less directly with the drive belt since direct frictional interaction between the fused silica supporting rollers and the stub rollers on which they are carried is avoided and the frictional coupling of the belt to the stub rollers is no longer pertinent. The rollers are coupled by the glass, thereby preventing scratching.

According to another feature of the invention, the drive belt (if only one is provided on one side of the oven) or the drive belts (if two are provided symmetrically on opposite longitudinal sides of the oven) constituting the endless drive belt means, can be driven by a pair of drive motors through respective stepped-down gearing units and overrunning clutches at opposite ends of the oven such that two drive motors are coupled to each belt and are energized to drive the belt in opposite directions with each having a variable frequency control.

Microprocessor or other computer means, preferably, provided with a random signal generator or preprogrammed or selectively programmable signal generator, can be coupled to these motors for permitting the glass to oscillate in a random, preprogrammed or in an automatically selected reciprocating manner while in the furnace.

The two motors which are operated to drive the belt or belts in opposite senses are coupled to the belt through respective overrunning clutches to ensure rapid switch-over from one motor to the other while maintaining the drive belt always under tension.

Best results have been obtained with a belt which consists of a silicone rubber coated fiberglass reinforcement fabric. Of course, other belts (e.g. metal) having a high-friction coefficient, refractory and low-extensibility properties may also be used.

A pneumatic take-up unit can be provided to maintain the tension on the belt in additon to the tension provided by the motors described.

According to another feature of the invention, a display or monitor, preferably of the computer CRT or video type is provided together with a computer keyboard to interrogate the computer which controls the oven to display, for example, the status of the heating panels to display the actual temperatures in a matrix pattern within the oven, to impose a desired set of operating conditions on the motors or the heaters, etc.

According to yet another feature of the invention, the stub rollers are mounted upon shafts fixed at one end to the open support structure, these stub rollers having bearings engaging the shaft. The shafts are formed with axial bores opening toward a wall which is removable from the support and which can carry pins engaging in the shafts to provide free-end support thereof.

These pins can carry removable centering-discs which project radially beyond the stub rollers to prevent lateral movement of the belt and, moreover, to engage the support rollers if they tend to migrate to one side or the other. These discs can be composed of metal or a low friction material such as polytetrafluoroethylene (Teflon) or Delrin. A grease nipple can be provided on the pin which is tubular to allow grease to be forced between the pin and the shaft.

The removable side thus permits ready access to the stub rollers for stub roller replacement or belt replacement or maintenance.

The oven, according to the invention, can be provided with means for introducing sulfur dioxide at the entry end of the furnace, and advantageously is provided with a scanning pyrometer which sweeps back and forth across the exiting glass articles and with means for displaying the output of this scanning pyrometer to enable manual correction through the computer of the individual heaters or automatic correction of the heating effects thereof. Alternatively or in addition I may provide one or more pyrometers trained on the path of the glass through respective heaters above the path, e.g. through passages in such heaters. Preferably a PID (proportional-integral-differential) control is provided for the heaters in response to the temperature detected at corresponding locations of the exiting glass body.

According to yet another feature of the invention, the heater bank is vertically adjustable in whole or in part by fluid-operated cylinders, electric screw jacks or other elevating means also under control of the computer from the monitor and keyboard unit.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
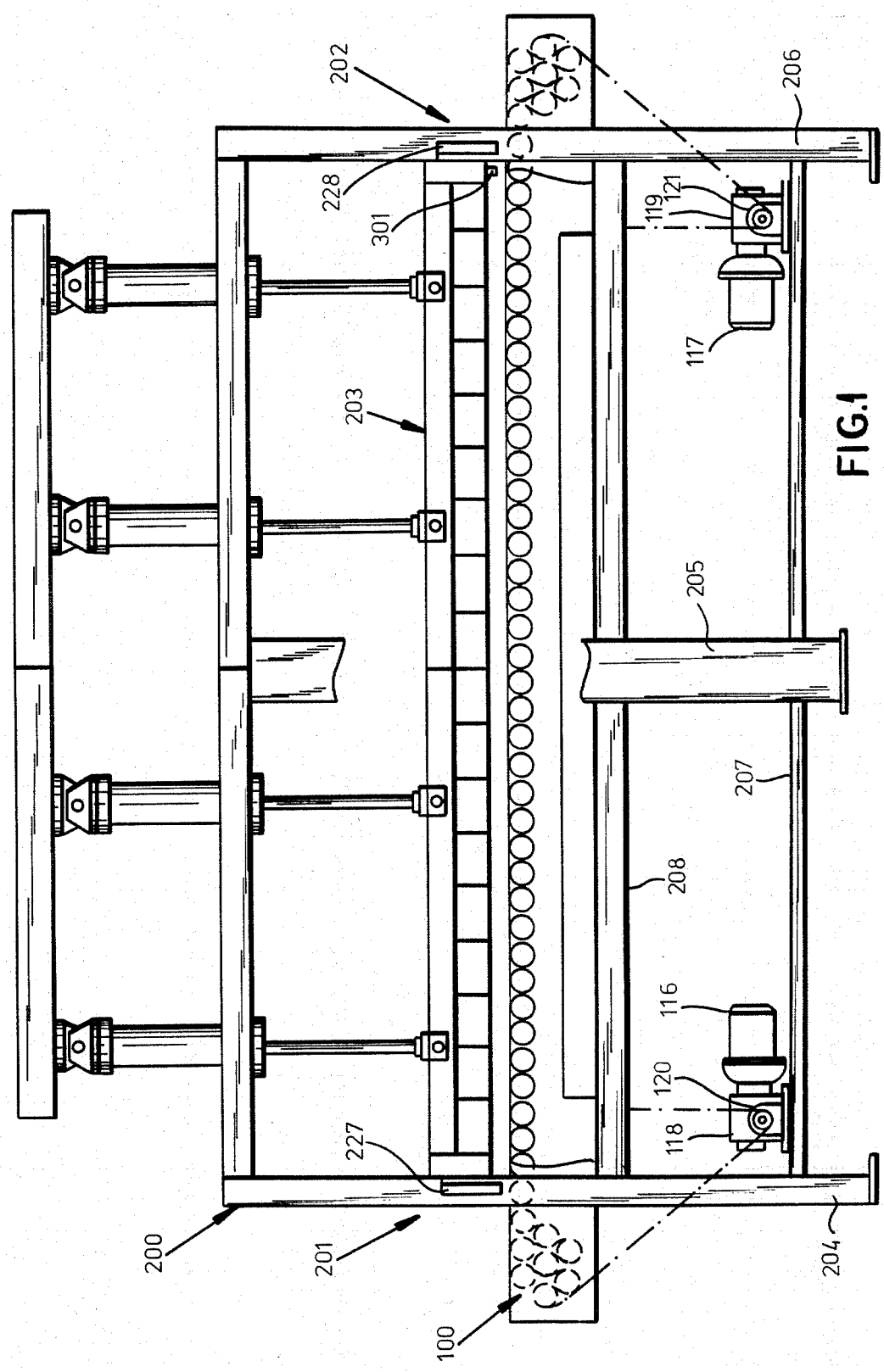
FIG. 1 is a diagrammatic side-elevational view of a glass-treating oven embodying this invention.
Figure 2:
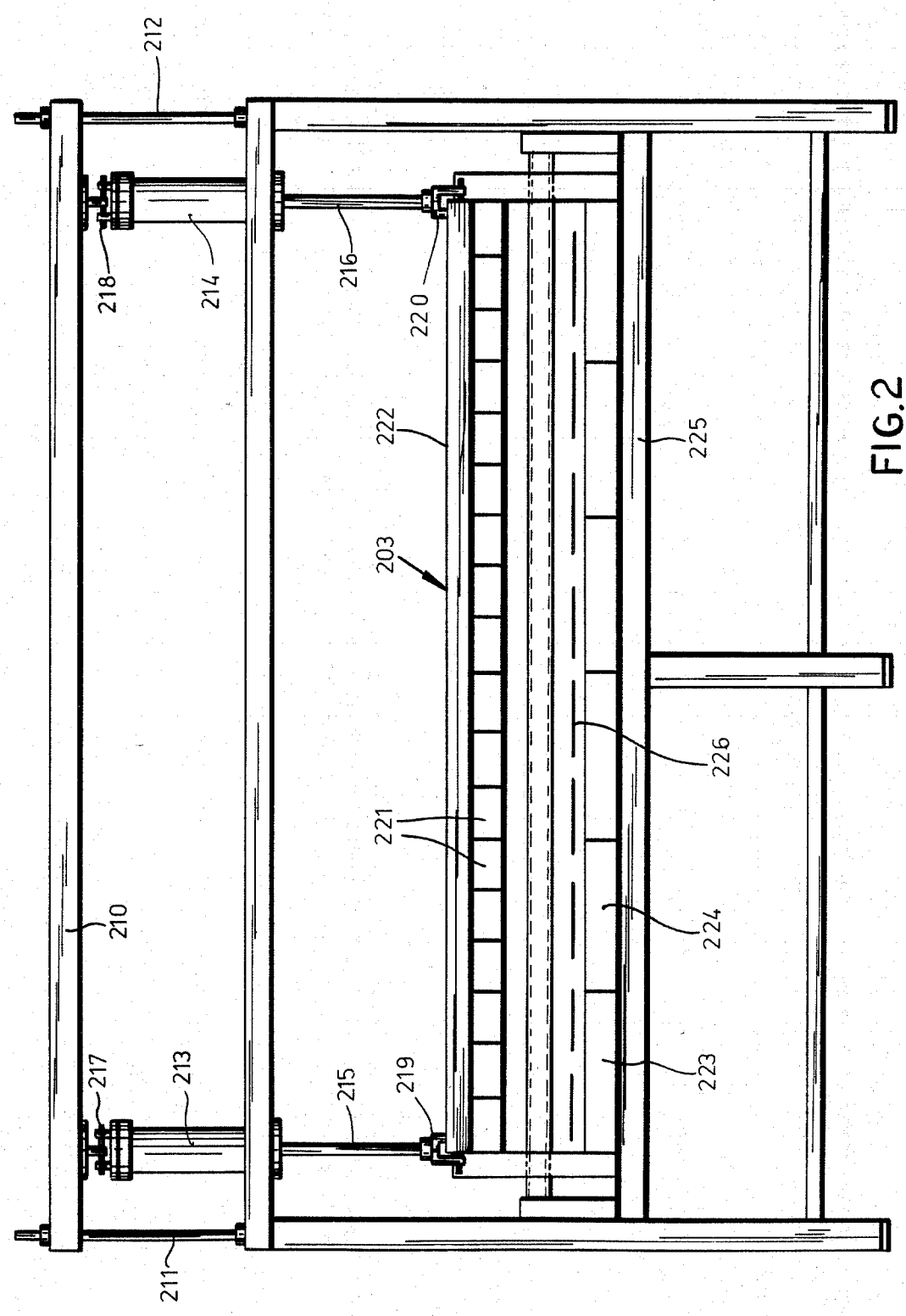
FIG. 2 is an end view thereof.

As can be seen basically from FIGS. 1 and 2, the furnace of the present invention for the treatment of glass, e.g. glass panes at an elevated temperature, comprises a roller conveyor 100 which extends through the furnace structure 200 from an inlet side 201 to an outlet side 202 beneath an array 203 of infrared (quartz) heaters and above other radiant heaters which are electrically operated.

The basic elements of the furnace structure include support posts 204, 205, 106 interconnected by horizontal members 207 and 208, the latter forming one wall 209 of the conveyor support structure which will be described in greater detail hereinafter.

The posts also carry a headpiece 210 via rods 211, 212 and from the headpiece, fluid-operated cylinders (or elevator jacks) 213, 214 depend to carry the heater array 203, the cylinders acting via the piston rods 215, 216. Articulations are provided at 217, 218 between these cylinders and the headpiece 210 while articulations 219 and 220 are provided between the piston rod and the heater assembly. The full retraction upwardly of the heater assembly serves to open the furnace and provide access for repair. Otherwise the means described serve to allow the desired height of the heaters above the path to be set and/or adjusted.

Figure 5:
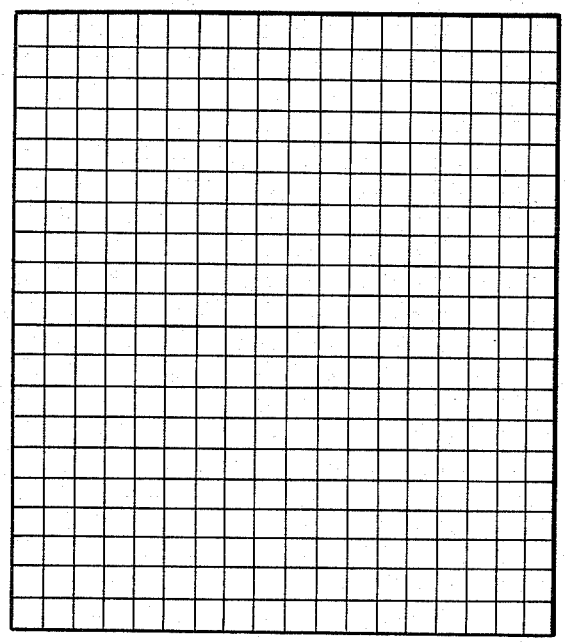
FIG. 5 is a diagram illustrating the lay-out of the heaters in the oven.

As can be seen from FIGS. 1 and 5, the heating assembly comprises a multiplicity of individual radiant heaters 221 disposed in a two-dimensional or matrix array having a number of heaters disposed contiguously across the path of the articles which move from left to right through the furnace as seen in FIG. 1. Similar rows of heaters are disposed substantially contiguously over the length of the path so that each of the heaters can be assigned a pair of coordinates representing the position of the heater in the array. A suitable number of heaters per row is twelve and an appropriate number of rows is twenty for heaters of a square configuration having dimensions of 8 inches on a side, for example, providing a furnace with a heated width of 96", for example, accommodating a maximum product width of, say, 84" and a heated length of 160" which can accommodate a reciprocating range of 136" for products with a maximum length of, say, 120".

The heaters can be carried on a common support represented at 222 provided with heavy insulation along its side facing away from the roller conveyor.

Below the roller conveyor, we may provide a number of zones 223, 224, etc., each of which can be provided with, say, six flatbed quartz heaters, each of which can have dimensions of 18×24" as may be required and which overlie the insulated bottom panel 225.

Between the bottom heaters 223, 224, etc. and the roller conveyor, it may be advantageous to provide a stainless steel sheet metal pan 226 to catch anything which may drop through the conveyor or may fall from the conveyor.

At the inlet side of the furnace, we may provide a pneumatically operated entry door 227 while a pneumatically operated exit door 228 may be provided at the opposite end. The pneumatic cylinders 213 and 214 allow considerable retraction of the upper heaters from the conveyor rollers, e.g. a vertical adjustment of 2" to 12" from the conveyor path while the sidewalls can remain in place.

Figure 3B:
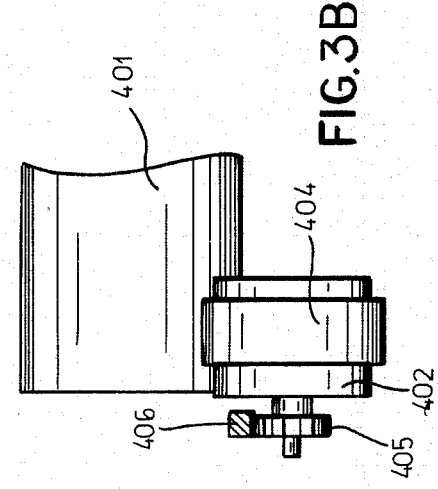
FIG. 3B is a fragmentary elevation thereof.
Figure 3:
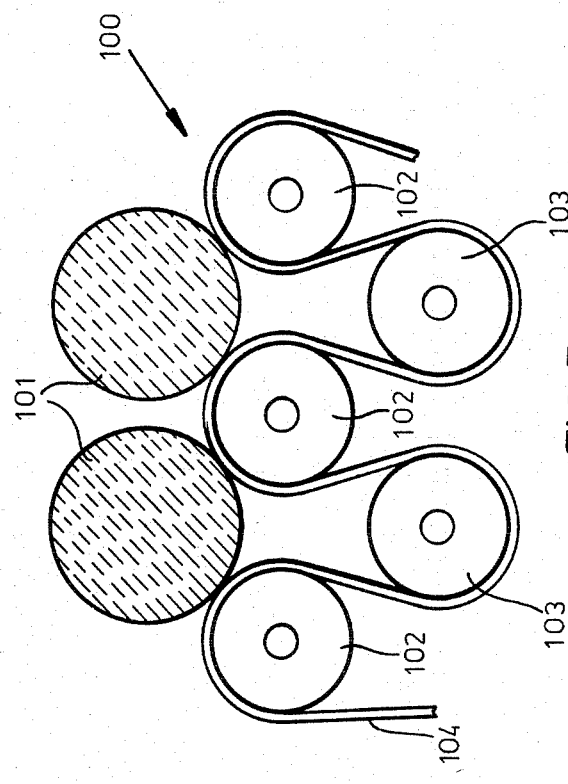
FIG. 3 is a diagram illustrating the support for the conveyor rollers of the invention.

The roller conveyor 1, which is used according to the invention, is provided with stub rollers as shown in FIG. 3 supporting the conveyor rollers. More particularly, the fused silica conveyor rollers 101 which are cylindrical and extend the full width of the oven (see FIG. 2) rest between pairs of upper stub rollers 102 between which and below which are provided lower stub rollers 103. A roller drive belt 204 passes over and under the successive stub rollers along the path so as to overshoot each of the upper stub rollers and undershoot each of the lower stub rollers as is shown in FIG. 3.

While this drive belt may be composed of any reinforcing material, e.g. glass fiber fabrics, steel fabric, canvas or even steel sheet, it preferably is formed with a silicone rubber coating which controls the friction coupling between the belt and the ceramic rollers 101.

Figure 3A:
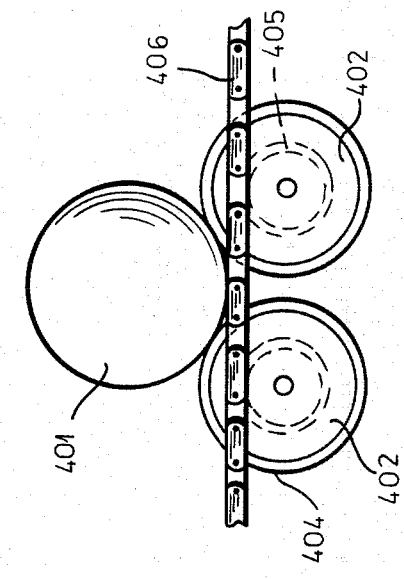
FIG. 3A is a similar diagram illustrating the support for the conveyor rollers in another embodiment.

As can be seen from FIGS. 3A and 3B, a less preferred drive system can support the fused silica rolls 401 on stub rollers 402 each of which is provided with a silicone-rubber band 404 and is driven by a chain 406 engaging sprocket 405 coupled with the stub rollers.

Figure 4:
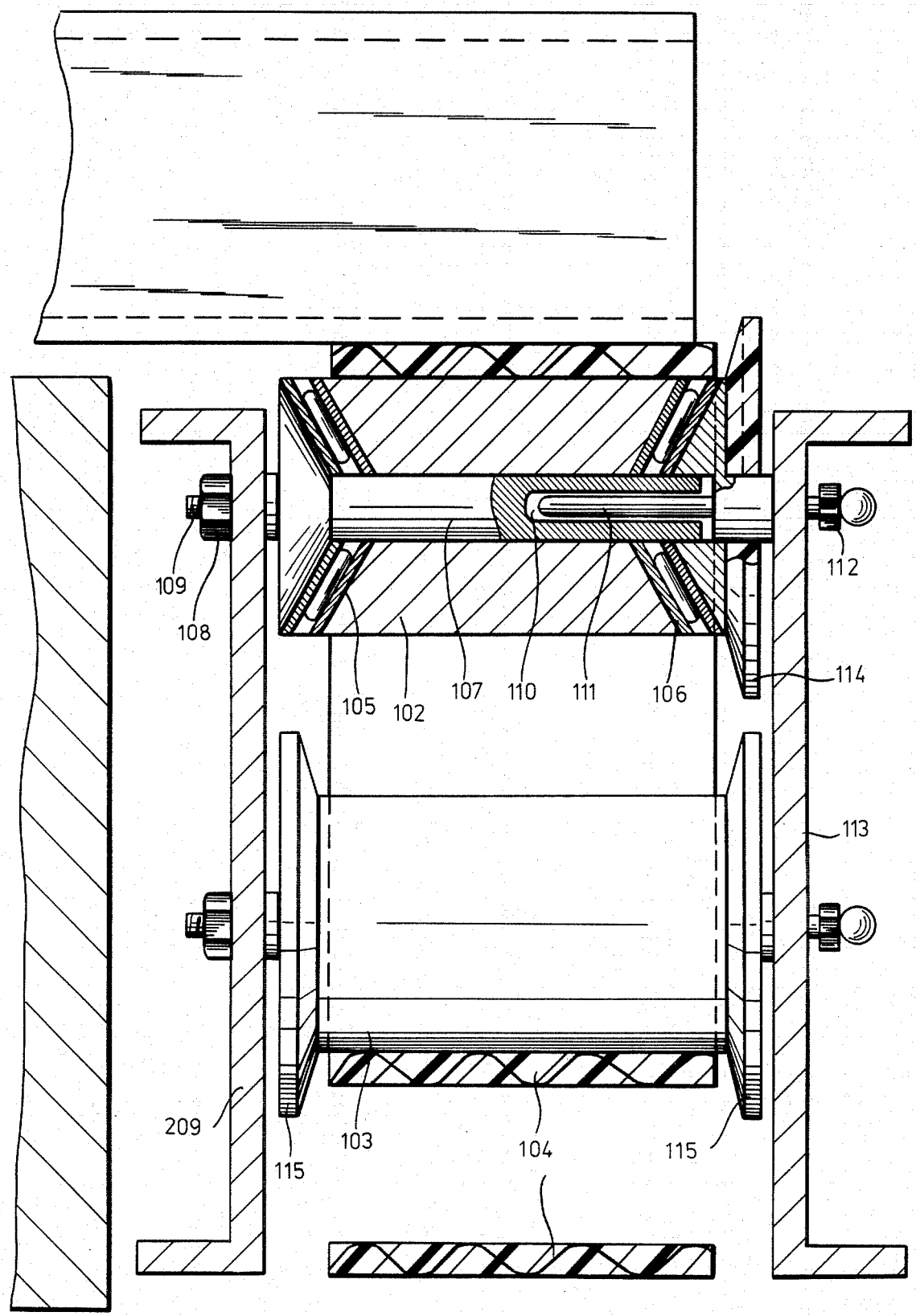
FIG. 4 is a vertical cross-sectional view through the stub roller assembly illustrating principles of this invention.

From FIG. 4, it will be apparent that each of the upper stub rollers 102 may be journaled via bearings 105, 106 on a shaft 107 fixed at one end to the support 209 of the furnace, e.g. by nuts 108 which are threaded onto the threaded extremities 109 of these bolts after they traverse the support 209.

Each of the shafts 107, in turn, is provided with an axially extending blind bore 110 into which a pin 111 can project. Each of the pins 111 is formed with a passage communicating with a grease nipple 112 which allows high temperature grease to be forced into the shaft 107 and into the bearings of the stub rollers as may be required.

The pins 111 are mounted upon a movable plate 113 which can be bolted to the posts 204, 206 or some other part of the support structure to provide the desired support for the free ends of the shafts 107.

The pins 111 also carry heat-resistant, low friction disks 114 which are removable from the pins 111 and can be replaced, these disks 114 having a frustoconical configuration and a diameter which enables them to project outwardly beyond the stub rollers 102 and thereby prevent the belt from migrating outwardly and also prevent migration of the freely resting support rollers 101 excessively to one side or the other since the conveyor support structure shown in FIGS. 3 and 4 is duplicated on the opposite side of the furnace as well.

The lower stub rollers 103 can be journaled on similar bearings, shafts and pin arrangements and can have frustoconical end disks 115 between which the belt is confined.

By simply moving the plate 113 and the support pins 111, etc., the serviceman can gain access to the belt and all of the stub rollers for ready replacement or for maintenance activities.

The belt 104 is driven by a pair of motors 116 and 117 through speed-reduction transmissions 118, 119 of the worm type and respective overruning clutches which are represented at 120 and 121 in FIG. 1. A pneumatically operated belt tensioner (not shown) can be provided to take up any other slack which may be generated in the belt. In practice the motors are alternately energized and when one more is energized, the clutch of the other operates in a free-loading mode so that there is no lag between changes of direction in the belt to produce the reciprocating motion previously described.

Figure 6:
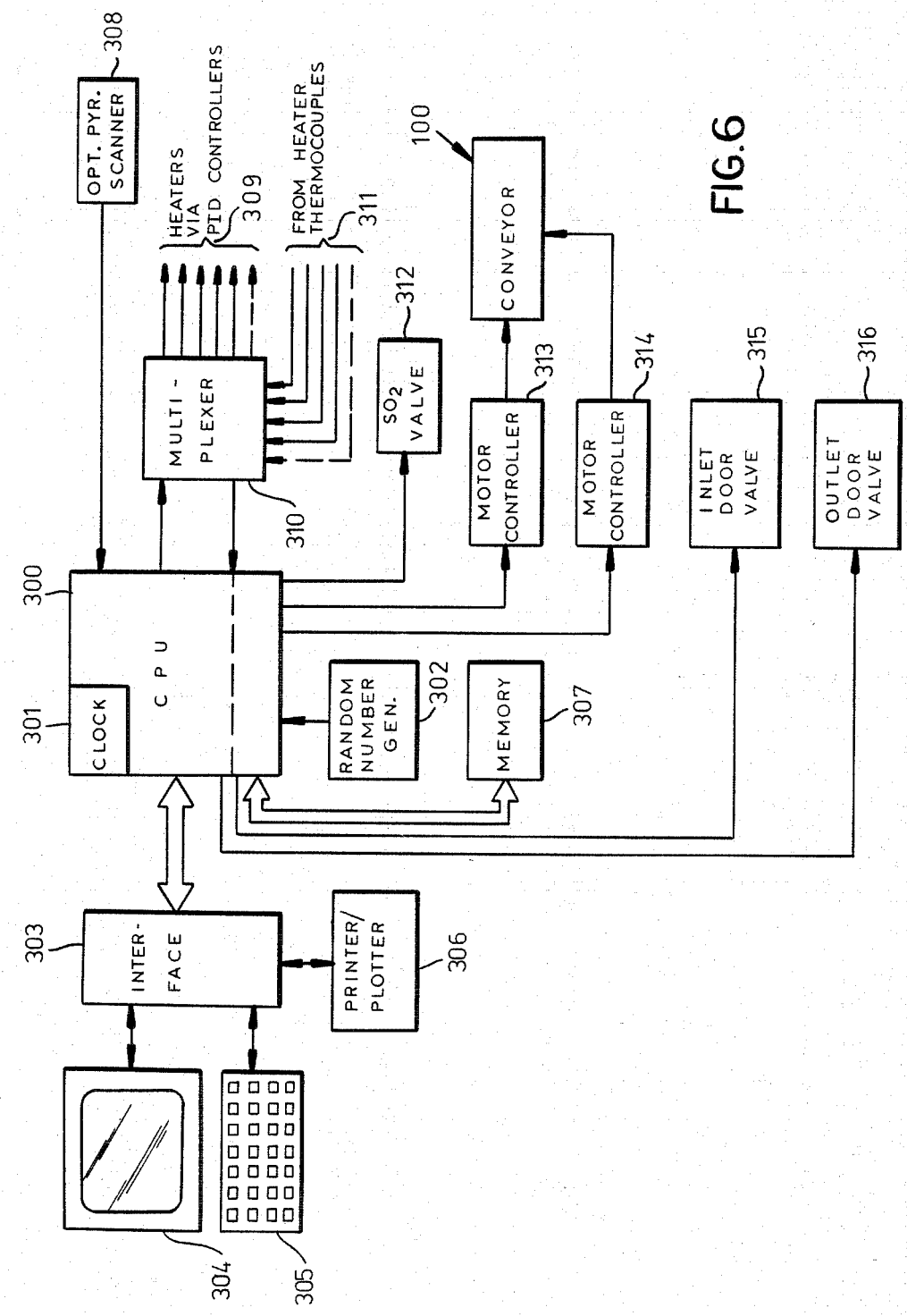
FIG. 6 is a block diagram illustrating some of the control characteristics of this furnace.

A scanner, shown only diagrammatically at 301 in FIG. 1 represents a scanning pyrometer or the like responsive to the temperature of the exiting product so as to enable the temperature profile of the glass object to be plotted longitudinally and transverse and enable control of the heaters utilizing the system shown diagrammatically in FIG. 6.

The system of FIG. 6 comprises a computer which, in the best mode embodiment of the invention, may be a 16 bit MACSYM 150 Micro computer (manufactured by Analog Devices), CP/M software compatible, 128K RAM with two floppy disk drives and which is represented at 300 and includes a clock 301 to permit reel time programming and with a random number generator 302 which is used to control the random movements of the conveyor for the random back-and-forth movements of the glass articles in the manner described.

The computer is provided with an interface 303 which can connect an operator console to the computer, the operator console having a monitor 304, a keyboard for inputting to the computer and represented at 305 and a plotter/printer 306. The external memory is represented at 307.

As will be apparent from FIG. 6, moveover, the CPU can receive an input as represented at 308 from the optical pyrometer, this input being the digital read-out from the optical pyrometer, an IRCON 7000 series pyrometer. Each of the heaters is provided with a PID controller as represented at 309 and these controllers receive output signals from a multiplexer 310 connected with the computer and inputs are delivered to the computer via the multiplexer from heater or heating zones thermocouples as represented at 311. The computer also controls, under preprogrammed instructions or operator action from the keyboard 305, the sulfur dioxide valve 312, the two motor controllers 313 and 314 for the motors driving the conveyor 100 and outputs to the inlet and outlet door valves 315 and 316 which operate the pneumatic door lifters, respectively.

Consequently, under the control of the action board 305, we may call upon the computer to regulate the conveyor speed, the oscillation distance, the oscillation rate, acceleration and deceleration to permit set-up of controlled acceleration-deceleration at the end of an oscillation and to ensure switching from one motor to the other to ensure that the drive belt is always in tension for smooth continuous action.

The computer also allows the set-up of all temperature zones displaying the desired temperatures in a graphic display or in coordinate location read out pattern from the heater matrix (see FIG. 5). Upon keying in the appropriate instructions we can display or read out actual temperatures, setpoint temperatures or deviations between actual and setpoint temperatures with the color graphic display or coordinate location readout.

The temperature setpoint and actual value information can also be printed out on the color plotter and printer and we can record the glass temperature profile determined by the optical pyrometer in hard copy on the printer and display same on the screen.

Because the computer can operate in a real time, setup of an operation sequence including conveyor entry speed, door opening, oscillation conditions as described, dwell time in the oven and conveyor exit speed can allow automatic operation with display on the monitor and with hard copy of the function set-up. The computer can also be utilized for simulation of the three-mode PID temperature control.

We claim:

1. A furnace for the heat treatment of glass including annealing, heat-strengthening, tempering and bending of glass which comprises:
    a housing defining an elongated furnace chamber having an inlet and an outlet;
    a roller conveyor between said inlet and said outlet and including two rows of stub rollers disposed along each side of said housing flanking a path between said inlet and said outlet including an upper row and a lower row with the stub rollers of the upper row being located between stub rollers of the lower row, a drive conveyor belt looped over each stub roller of each upper row and under a stub roller of the respective lower row therebetween on one side of said conveyor, and fused silica support rollers spanning said conveyor with each support resting upon two stub rollers of said upper row overshot by said belt;
    means for driving said belt to oscillate glass objects carried by said support rollers back and forth in said housing; and
    an array of infrared heaters mounted in said housing above said conveyor.

2. The furnace defined in claim 1 wherein said means for driving said belt includes a pair of motors each coupled to said belt through a respective overrunning clutch and located at opposite ends of said furnace and motors and overrunning clutches being effective in opposite directions for alternately driving said belt without play in opposite directions to oscillate said articles in said furnace.

3. The furnace defined in claim 1 wherein said conveyor includes a respective drive belt passing over and under stub rollers on each side of said furnace.

4. The furnace defined in claim 1 wherein said stub rollers are journaled on shafts fixed on said housing and have ends turned toward a movable support member, said movable support member being provided with pins receivable in said ends of said stub roller, said member being movable to find access to said stub rollers and said belt.

5. The furnace defined in claim 1, further comprising a computer provided with a random signal generator for operating said means for driving said belt.

6. The furnace defined in claim 5 wherein said computer includes means for preprogramming the operation of the drive of said belt.

7. The furnace defined in claim 1 wherein said infrared heaters are provided in a matrix array, said furnace further comprising a computer for displaying parameters for the operation of said heaters.

8. The furnace defined in claim 1, further comprising an optical pyrometer at said outlet for scanning articles emerging from said furnace, said furnace comprising a computer for displaying a thermal profile of said articles.

9. The furnace defined in claim 8 wherein said computer is provided with means for controlling each of said heaters in a respective proportional-integral-differential mode to regulate the temperature thereof, said means including silicon controlled rectifier power controllers for modulating power to said heaters and responsive to signals originating in said computer.

* * * * *